United States Patent
Brothers et al.

(10) Patent No.: US 6,417,862 B1
(45) Date of Patent: Jul. 9, 2002

(54) DEVICE AND METHOD FOR BLENDING TRUE COLORS AND FOG COLORS TO GENERATE DISPLAY COLORS

(75) Inventors: John W. Brothers, Palo Alto; Zhou Hong, San Jose, both of CA (US)

(73) Assignee: S3 Graphics Co., Ltd., Grand Cayman (KY)

( * ) Notice: Subject to any disclaimer, the term of this patent is extended or adjusted under 35 U.S.C. 154(b) by 0 days.

(21) Appl. No.: 09/366,187

(22) Filed: Aug. 3, 1999

Related U.S. Application Data

(60) Provisional application No. 60/096,155, filed on Aug. 11, 1998.

(51) Int. Cl.[7] .............................................. G06T 11/40
(52) U.S. Cl. ........................ 345/589; 345/604; 345/606
(58) Field of Search ................................ 345/589–599, 345/600–606, 426, 519, 505; 382/162, 163, 164, 165, 166, 167

(56) References Cited

U.S. PATENT DOCUMENTS

| | | | | |
|---|---|---|---|---|
| 5,345,541 A | * | 9/1994 | Kelley et al. | 345/426 |
| 5,444,835 A | * | 8/1995 | Turkowski | 345/592 |
| 5,717,783 A | * | 2/1998 | Endo et al. | 382/167 |
| 5,724,561 A | * | 3/1998 | Tarolli et al. | 345/561 |
| 5,754,185 A | * | 5/1998 | Hsiao et al. | 345/592 |
| 5,805,868 A | * | 9/1998 | Murphy | 345/502 |
| 6,064,392 A | * | 5/2000 | Rohner | 345/426 |
| 6,184,891 B1 | * | 2/2001 | Blinn | 345/426 |

\* cited by examiner

*Primary Examiner*—Matthew Luu
*Assistant Examiner*—Thu-Thao Havan
(74) *Attorney, Agent, or Firm*—Carr & Ferrell LLP

(57) ABSTRACT

A device calculates a display color based on a true color, a fog color, and a distance z. The device uses two single-port memories, an arithmetic circuit, and a color blending circuit. Based on the distance z, two sampled values of a fog function are read from the single-port memories, one value from each memory. The arithmetic circuit calculates an approximate value of the fog function corresponding to the distance z based on the two sampled values of the fog function. The color blending circuit calculates the display color by blending the true color and the fog color according to the approximate value of the fog function.

28 Claims, 11 Drawing Sheets

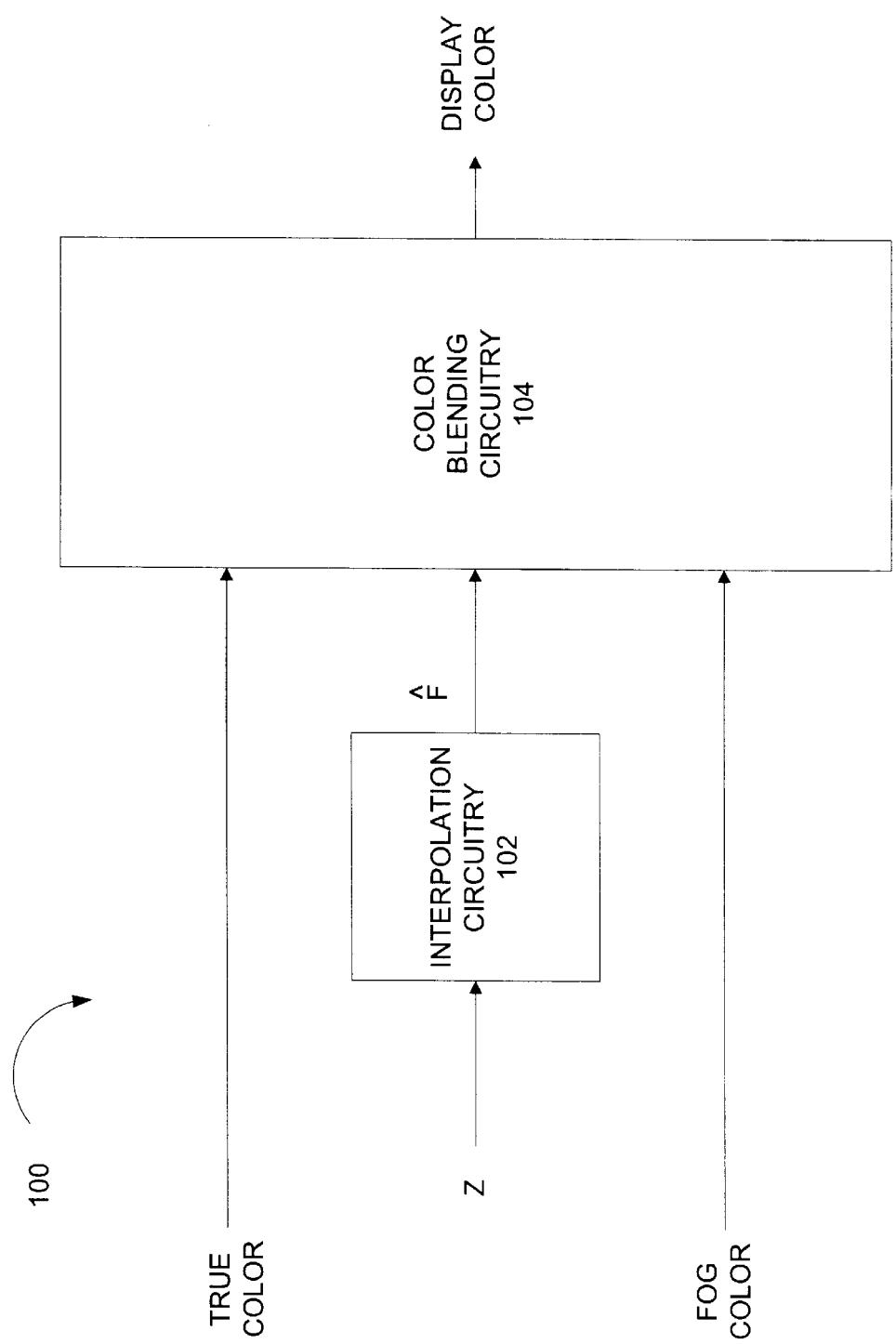

DEVICE AND METHOD FOR BLENDING TRUE COLORS AND FOG COLORS TO GENERATE DISPLAY COLORS

CROSS-REFERENCE TO RELATED APPLICATION

This application claims the benefit of U.S. Provisional Patent Application Serial No. 60/096,155, "Device and Method for Blending True Colors and Fog Colors to Generate Display Colors", by John Brothers and Zhou Hong, filed Aug. 11, 1998, which subject matter is incorporated herein by reference.

BACKGROUND OF THE INVENTION

1. Field of the Invention

This invention relates generally to processing of three-dimensional computer graphics, and more particularly, to the blending of true colors and fog colors to produce display colors.

2. Description of the Related Art

As a result of advances in technology there is an increasing demand for realistic three-dimensional computer graphics and video. Fogging is the phenomenon in which objects become blurry and fuzzy and appear to fade in color as the distance between the object and viewer increases. It is desirable to simulate fogging in order to render realistic three-dimensional graphics.

Fogging typically is implemented in the following manner. Each object or pixel to be rendered has a true color and a fog color. The true color is the color which the object would appear if it were close to the viewer. The fog color is the color which the object would appear if it were far away from the viewer. For example, the true color of a carrot might be orange; while the corresponding fog color might be gray. A fog function describes the manner in which the actual displayed color varies from the true color to the fog color as the distance between viewer and object increases.

To calculate the proper display color for an object, a graphics accelerator typically receives the true color, the fog color, and the distant z from the object to the viewer. The accelerator calculates the value of the fog function for the distance z and then blends the true color and the fog color accordingly to arrive at the display color.

The fog function is typically calculated by interpolation. In one approach, sampled values of the fog function are stored in a memory which only has a single output port ("single-port memory") and so can only support one read per clock cycle. However, at least two values are required to interpolate the fog function so at least two cycles are required to read out the required sampled values. This is slow. In another approach, the sampled values may be stored in a memory with multiple output ports thus allowing multiple reads in a single cycle. In this case, the required sampled values may be read out in a single clock cycle. This type of memory, however, is typically more expensive.

Hence, there is a need for a device which interpolates a fog function by reading the required sampled values of the fog function in a single clock cycle, but which only uses single-port memory.

SUMMARY OF THE INVENTION

In accordance with the present invention, a device for calculating a display color based on a true color, a fog color, and a distance z preferably includes an index generator, two memories, an arithmetic circuit, and a color blending circuit. The index generator receives the distance z and generates two memory addresses, one for each memory. Two sampled values of a fog function are read from the memories according to the memory addresses. The arithmetic circuit receives the sampled values of the fog function and calculates an approximate value of the fog function which corresponds to the distance z. The arithmetic circuit preferably calculates the approximate value by linearly interpolating between the two sampled values. The color blending circuit then calculates the display color by blending the true color and the fog color according to the approximate value of the fog function.

In further accordance with the present invention, a method for calculating a display color based on a true color, a fog color, and a distance z includes the following steps. The distance z, the true color, and the fog color are received. Two memory addresses are generated responsive to the distance z. Two sampled values of a fog function are read from two memories according to the memory addresses, one from each memory. An approximate value of the fog function corresponding to the distance z is calculated based on the two sampled values of the fog function. The display color is then calculated by blending the true color and the fog color according to the approximate value of the fog function.

BRIEF DESCRIPTION OF THE DRAWING

The invention has other advantages and features which will be more readily apparent from the following detailed description of the invention and the appended claims, when taken in conjunction with the accompanying drawing, in which:

FIG. 1 is a block diagram of a system 100 for simulating the fogging phenomenon;

DETAILED DESCRIPTION OF THE PREFERRED EMBODIMENTS

FIG. 1 is a block diagram of a system 100 which simulates the fogging phenomenon by calculating a display color of an object or pixel based on a true color, a fog color and a distance z. The true color is the color which the object would appear if it were close to a viewer. For example, the true color of a carrot might be orange. The fog color is a color which accounts for the phenomenon that distant objects become fuzzy and blurred and appear to fade in color. Continuing the previous example, the fog color of the carrot might be gray. The distance z represents the distance from the viewer to the object. Hence, the actual display color will range from the true color to the fog color, depending on the distance z.

The system 100 includes interpolation circuitry 102 and color blending circuitry 104. The interpolation circuitry receives a distance z and is coupled to send a value of a fog function F to the color blending circuitry 104. The color blending circuitry 104 additionally receives the true color and the fog color and outputs the display color.

The interpolation circuitry 102 receives the distance z and approximates the value of fog function F corresponding to the distance z, the approximate value denoted by Fapprox. The interpolation circuitry 102 does so by interpolating between sampled values of the fog function F and, in a preferred embodiment, the interpolation is a linear interpolation. The fog function simulates the fogging phenomenon as the distance to the object varies. For example, if the object was distant, then the fog function F might be equal to one and the display color would equal the fog color. At the other extreme, if the object was close, the fog function F might be equal to zero and the display color would equal the true color. At distances in between the two extremes, the fog function F determines the blending of the true color and the fog color.

The color blending circuitry 104 generates the display color by blending the fog color and the true color based on the approximate fog function Fapprox. The color blending circuitry may be implemented in a number of ways, including the approaches described in col. 36, line 35 to col. 39, line 26 of U.S. Pat. No. 5,345,541, "Method and Apparatus for Approximating a Value Between Two Endpoint Valves in a Three-Dimensional Image Rendering Device," and the entirety of U.S. Pat. No. 5,444,835, "Apparatus and Method for Forming a Composite Image Pixel through Pixel Blending," both of which are incorporated herein by reference. In a preferred embodiment, the blending is essentially a linear interpolation between the true color and the fog color according to the equation display color=(Fapprox)(fog color)+(1−Fapprox)(true color).

Figure 2A:
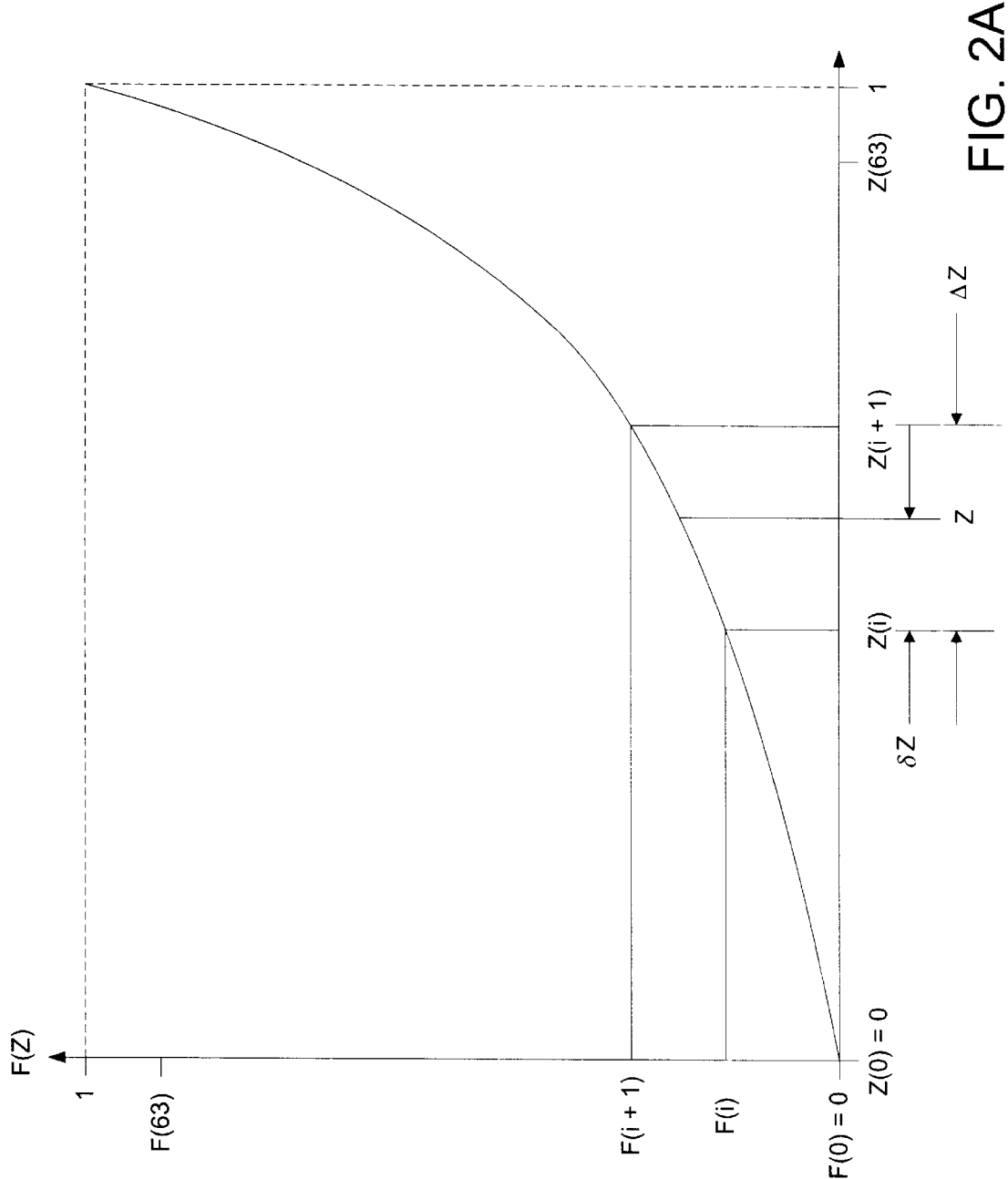
FIG. 2A is a graph illustrating interpolation of a fog function F.
Figure 2B:
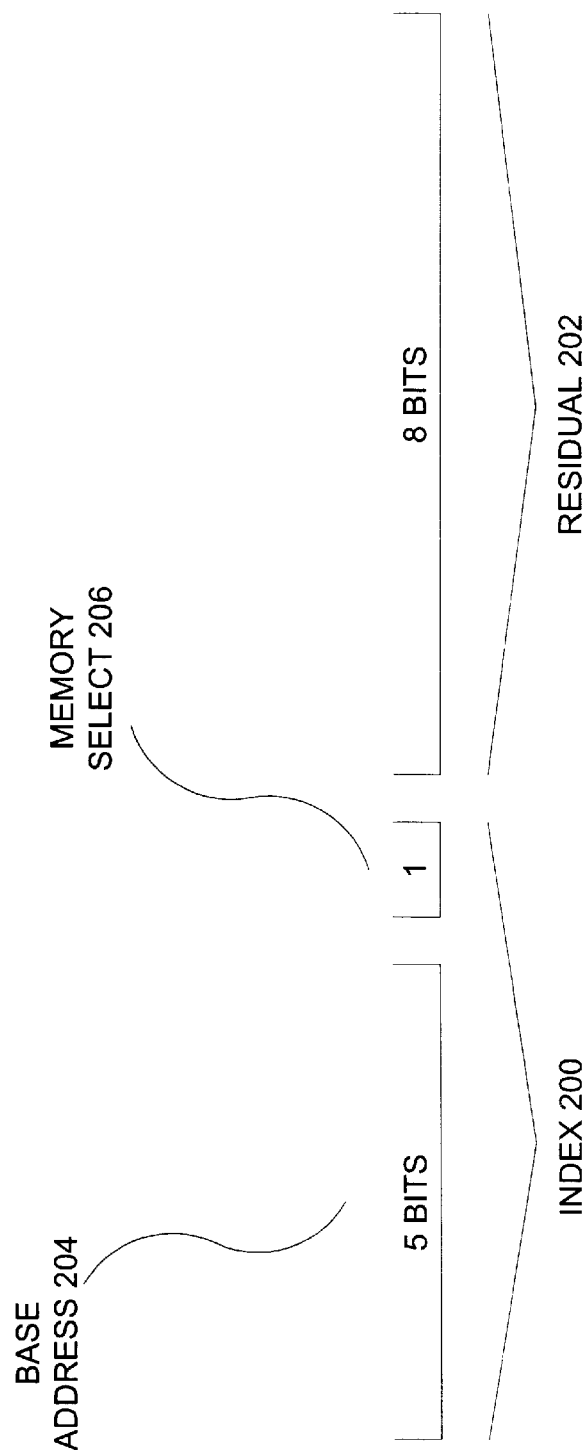
FIG. 2B is a preferred bitwise representation of a distance z.

FIGS. 2A and 2B introduce nomenclature and preferred embodiments used throughout this description. FIG. 2A is a graph illustrating interpolation of the fog function F. The dependent variable F is a function of the independent variable z. In this case, F is the fog function and z is distance to the viewer. Sampled values of the two variables, denoted $F(i)$ and $z(i)$ where i is an index, are known and the interpolation circuitry 102 approximates values of F for non-sampled values of z by interpolating between the sampled values $z(i)$. If $z(i)<z<z(i+1)$, then the corresponding approximate value Fapprox typically will be based on the sampled values $z(i)$ and $z(i+1)$, the residual $\delta z=z-z(i)$, the interval $\Delta z(i)=z(i+1)-z(i)$, and the corresponding quantities for F. In a preferred embodiment, both variables z and F are normalized to the interval [0,1], with $F(0)=0$ corresponding to a close object and $F(1)=1$ corresponding to a distant object. Although various aspects of the invention will be described using this preferred embodiment of the fog function, other fog functions are possible. For example, the distance variable z may vary from 0 to infinity, reflecting the actual distance between viewer and object, or may decrease rather than increase with increasing distance between viewer and object. Alternately, the fog function F may vary over any range and may decrease as a function of distance rather than increasing as in the disclosed embodiments.

FIG. 2B is a preferred bitwise representation of distance z. In this embodiment, z is represented by 14 bits. The interpolation of the fog function F, however, is based on 64 evenly spaced samples of z. Hence, the first six bits 200 of z represent both the sampled values of $z(i)$ and the corresponding index i which ranges from 0–63. For purposes that will be apparent later, the first six bits 200, which will be referred to as the index i, are subdivided into the first five bits 204, which will be referred to as a base address, and the sixth bit 206, which will be referred to as a memory select. The remaining eight bits 202 of variable z represent the residual $\delta z$. The interval $\Delta z$ is constant since the sampled values of z are evenly spaced.

Figure 3:
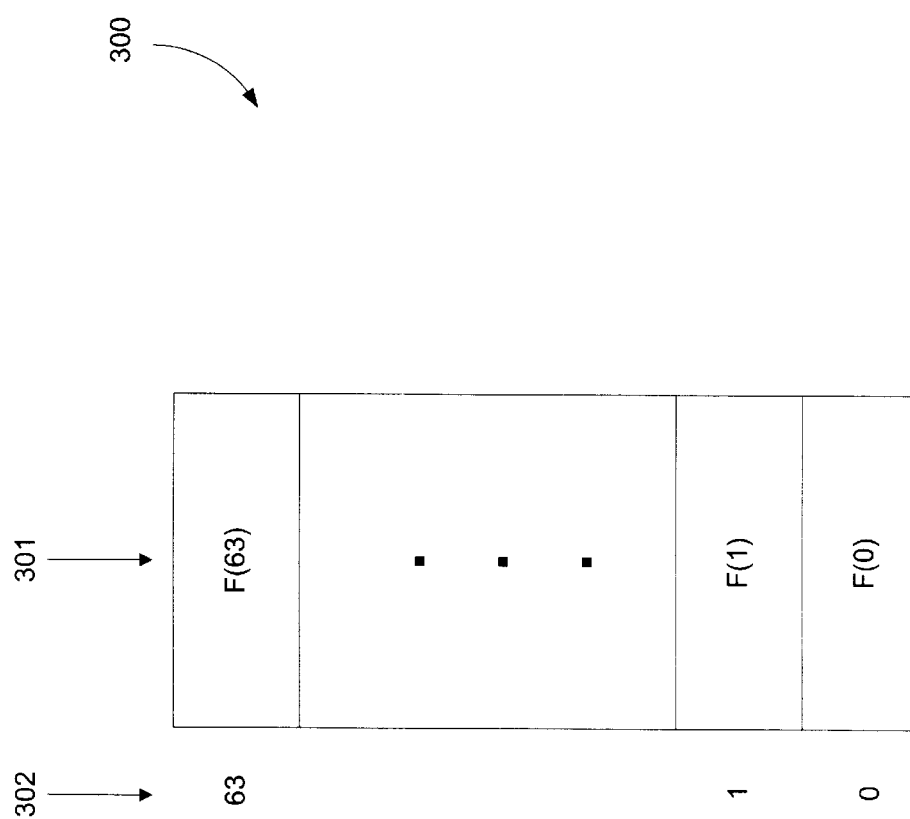
FIG. 3 is a schematic diagram illustrating a sampled value memory 300 according to the prior art.

FIG. 3 is a schematic diagram illustrating a sampled value memory 300 according to the prior art, which may be used to perform the interpolation of F described above. The sampled value memory 300 includes 64 memory locations 301, as indicated by the memory addresses 302 0–63. Each of these memory locations 301 contains a sampled value $F(i)$, where index i also ranges from 0–63. For convenience, the index i and the address 302 are identical for each memory location. In other words, $F(i)$ is stored at the memory location with address A=i.

If the interpolation circuitry 102 uses the sampled value memory 300, then the two values $F(i)$ and $F(i+1)$ are read from the sampled value memory 300 in order to perform linear interpolation. This typically can be done in one of two ways. In the first approach, if the sampled value memory 300 is implemented in a memory which only has a single output port and thus can only support one read at a time ("single-port memory"), then the two values must be read serially. $F(i)$ may be read during a first clock cycle and $F(i+1)$ during the next. This approach, however, is slow because it requires two clock cycles to read out the values required for the interpolation. In the second approach, the sampled value memory 300 may be implemented in a memory which has multiple output ports and thus allows the reading of multiple values in a single clock cycle (typ., dual-port memory). Then, $F(i)$ and $F(i+1)$ may both be read in parallel from sampled value memory 300 in a single clock cycle. This approach, however, typically requires the use of dual-port memory which is more expensive than single-port memory.

Figure 4:
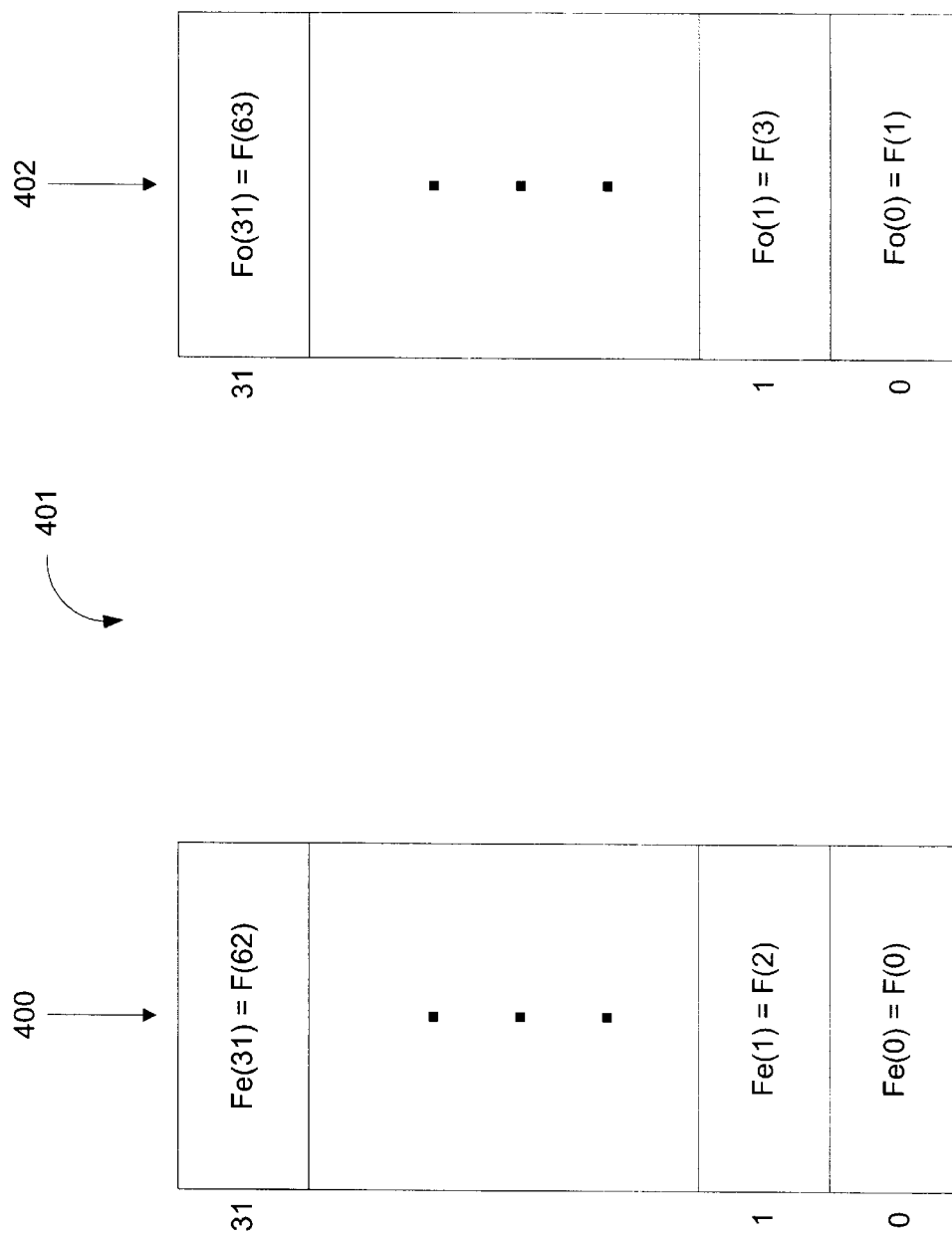
FIG. 4 is a schematic diagram illustrating a sampled value memory 401 in accordance with the invention.

FIG. 4 is a schematic diagram illustrating a sampled value memory 401 in accordance with the present invention. The sampled value memory 401 includes two single-port memories 400 and 402, each with 32 memory locations or half the number contained in the single sampled value memory 300 of FIG. 3. The total capacity of the sampled value memory 401, however, is equal to the capacity of sampled value memory 300. The sampled values of the fog function F are stored alternately in the two single-port memories 400 and 402. For example, $F(0)$ is stored at address 0 of memory 400, $F(1)$ is stored at address 0 of memory 402; $F(2)$ is stored at address 1 of memory 400; and so on. The samples $F(i)$ with even indices i are stored in single-port memory 400; while the samples with odd indices are stored in single-port memory 402. Therefore, for convenience, memory 400 will be referred to as the even memory while memory 402 will be referred to as the odd memory. $Fe(j)$ will be used to refer to the contents of the memory location in the even memory 400 with address Ae=j; while $Fo(j)$ will be used to refer to the contents of address Ao=j of the odd memory 402. Under this convention, Fe(j)=F(2*j*) and Fo(j)=F(2*j*+1). Note that the required linear interpolation will always require one value from the even memory 400 and one value from the odd memory 402.

It should be noted that the indices and addresses used in the above embodiments were chosen for convenience and the invention is not limited to these conventions. For example, it is not necessary that the addresses and indices have the numerical relationships given above or that the sampled values stored alternately in memories 400 and 402 are stored beginning with the even memory 400.

Figure 5:
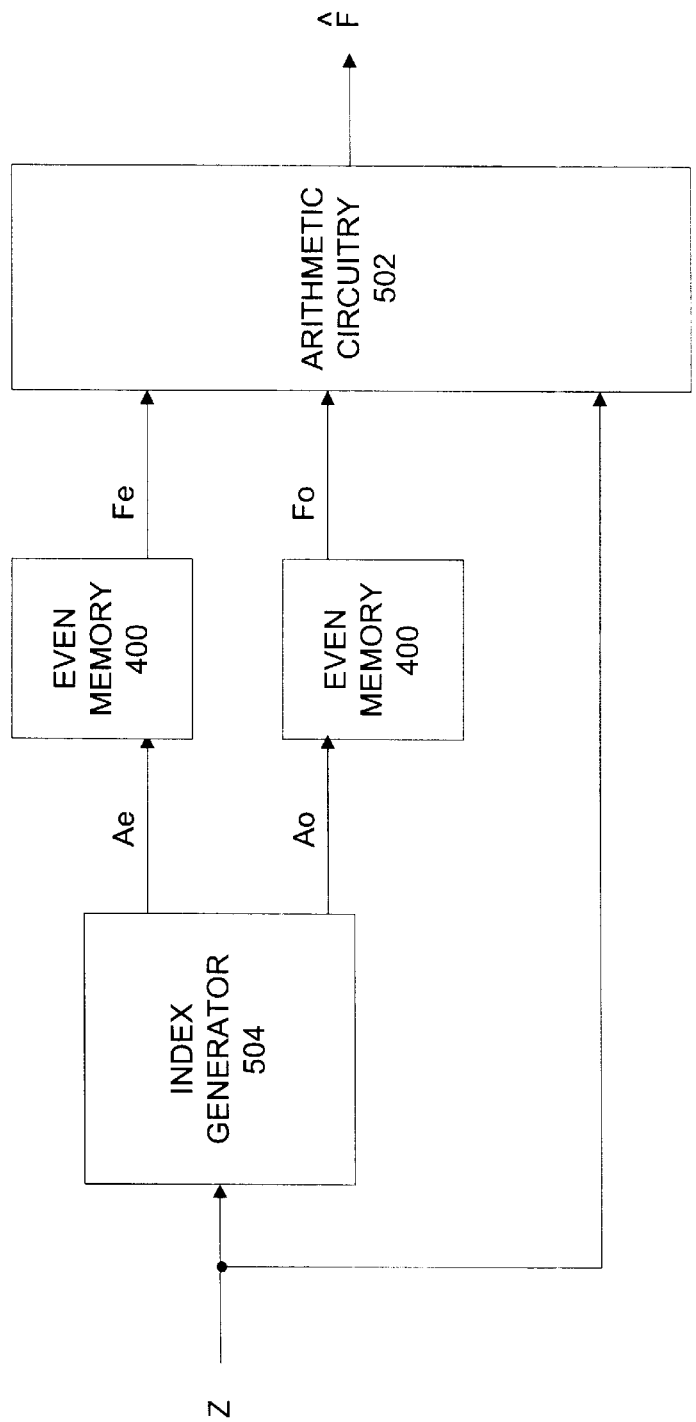
FIG. 5 is a block diagram of a preferred embodiment of interpolation circuitry 102 using the memories 400 and 402 of FIG. 4.

FIG. 5 is a block diagram of a preferred embodiment of interpolation circuitry 102 using the single-port memories 400 and 402 of FIG. 4. The interpolation circuitry 102 additionally includes an index generator 504 and arithmetic circuitry 502. The components are coupled as follows. The index generator 504 receives the distance z and is coupled to send addresses Ae and Ao to the even and odd memories 400 and 402, respectively. The arithmetic circuitry 502 is coupled to receive the sampled values of the fog function, Fe and Fo, from the memories 400 and 402, respectively, and also receives the independent variable z. The arithmetic circuitry 502 outputs the interpolated value of the dependent variable F.

Figure 6:
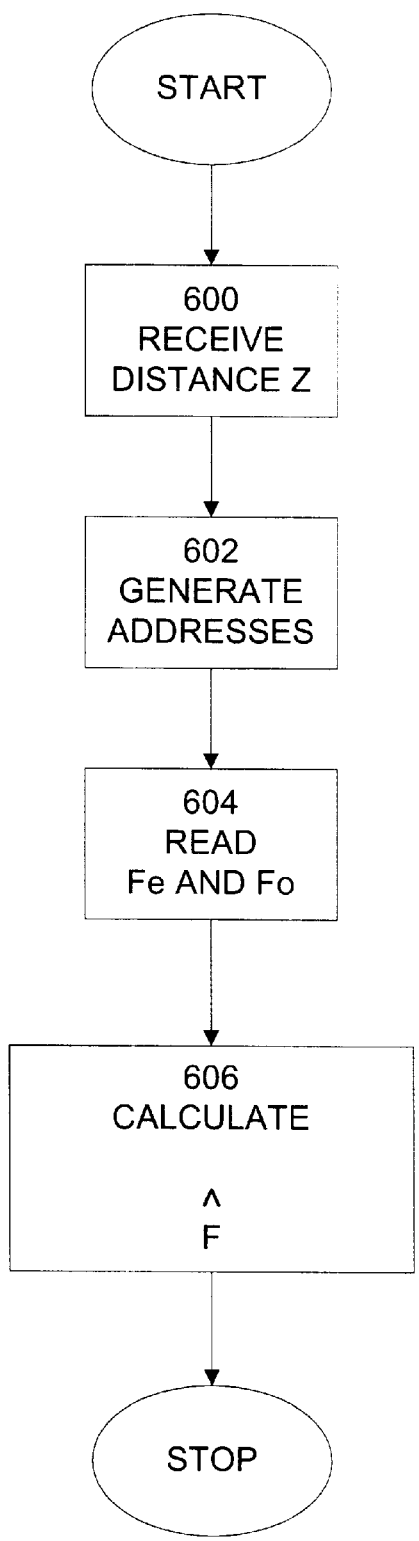
FIG. 6 is a flow diagram illustrating a preferred method for calculating a fog function in accordance with the interpolation circuitry 102 of FIG. 5.

FIG. 6 is a flow diagram illustrating a preferred method for interpolating the fog function F in accordance with the interpolation circuitry 102 of FIG. 5. The interpolation circuitry 102 receives 600 the distance z. The index generator 504 then generates 602 the addresses Ae and Ao for the even and odd memories 400 and 402, respectively. The two memories 400 and 402 read 604 the sampled values Fe and Fo required to interpolate the fog function F from the corresponding memory locations, preferably in a single clock cycle. The arithmetic circuitry 502 then calculates 606 the approximate value Fapprox, based on the received sampled values Fe and Fo and the received independent variable z.

Figure 7:
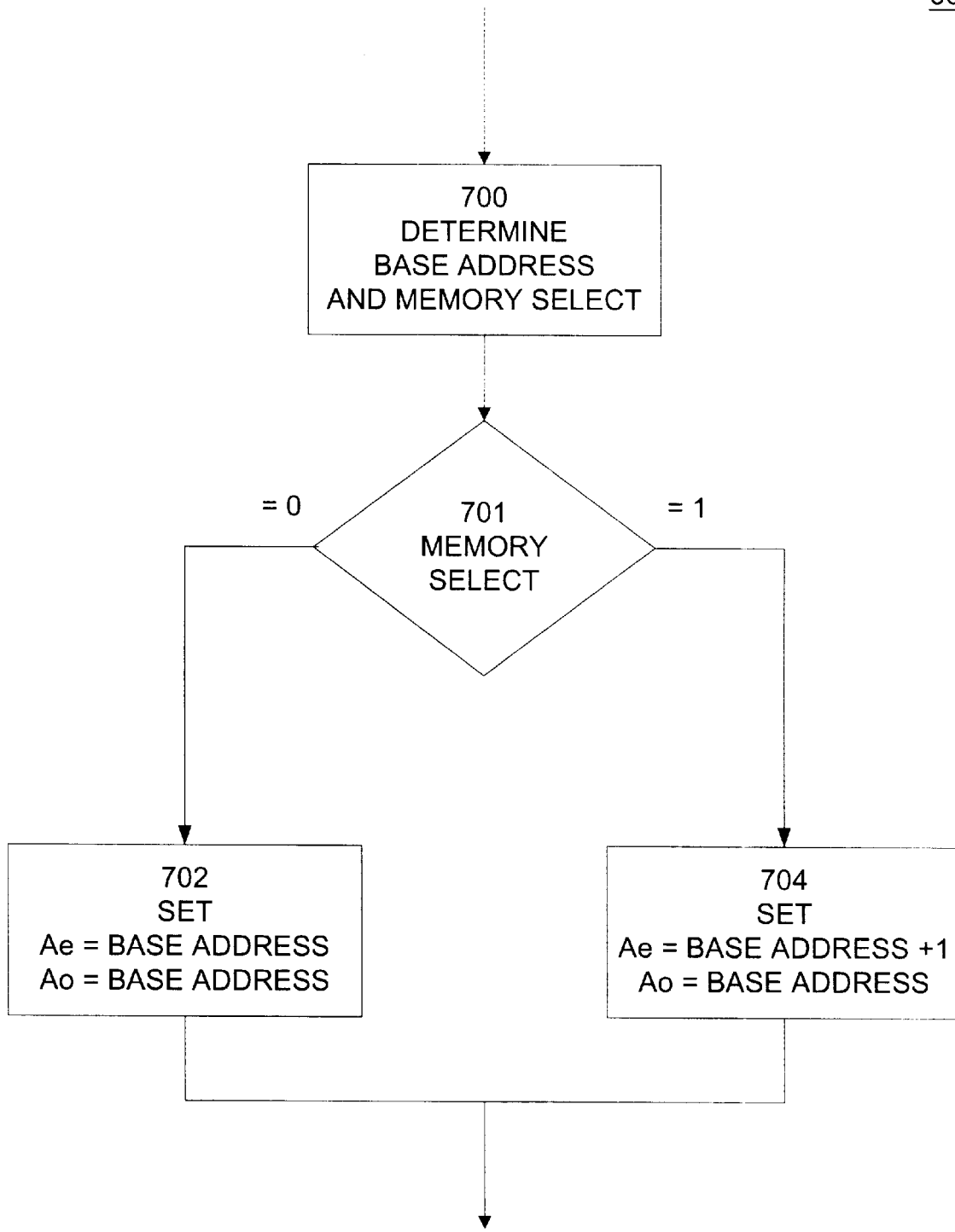
FIG. 7 is a flow diagram illustrating a preferred embodiment of step 602 of FIG. 6 of generating addresses.

FIG. 7 is a flow diagram illustrating a preferred embodiment of step 602 of FIG. 6 of generating addresses. The index generator 504 first determines 700 the base address 204 and the memory select 206 of the received distance z. The index generator 504 then determines the even and odd addresses Ae and Ao based on the base address 204 and memory select 206. This determination may be explained by two examples.

For example one, assume that z=00111,0,00001111, where the commas have been added to separate the base address=00111, the memory select=0 and the residual= 00001111. Here, z falls between the two sampled values z(i)=00111,0,00000000 and z(i+1)=00111,1,00000000. These two sampled values have indices i=001110 and i+1= 001111, respectively. The first sample, therefore, will be stored in the even memory 400 at address Ae=00111=base address. The second sample will be stored in the odd memory 402 at address Ao=00111=base address.

For example two, let z=00111,1,00001111. Here, the memory select has been toggled from 0 to 1. This value of z now falls between samples z(i)=001111 and z(i+1)= 010000, with indices i=001111 and i+1=010000. The first sample is stored in the odd memory 402 at address Ao=00111=base address. The second sample is stored in the even memory 400 but at address Ae=01000=base address+1.

Referring again to FIG. 7, the addresses Ae and Ao depend 701 on the memory select 206. If the memory select 206 is not asserted, then the index generator 504 sets 702 the even address Ae=base address and the odd address Ao=base address. If the memory select 206 is asserted, then the index generator 504 sets 704 the even address Ae (base address+1) and the odd address Ao=base address.

Figure 8:
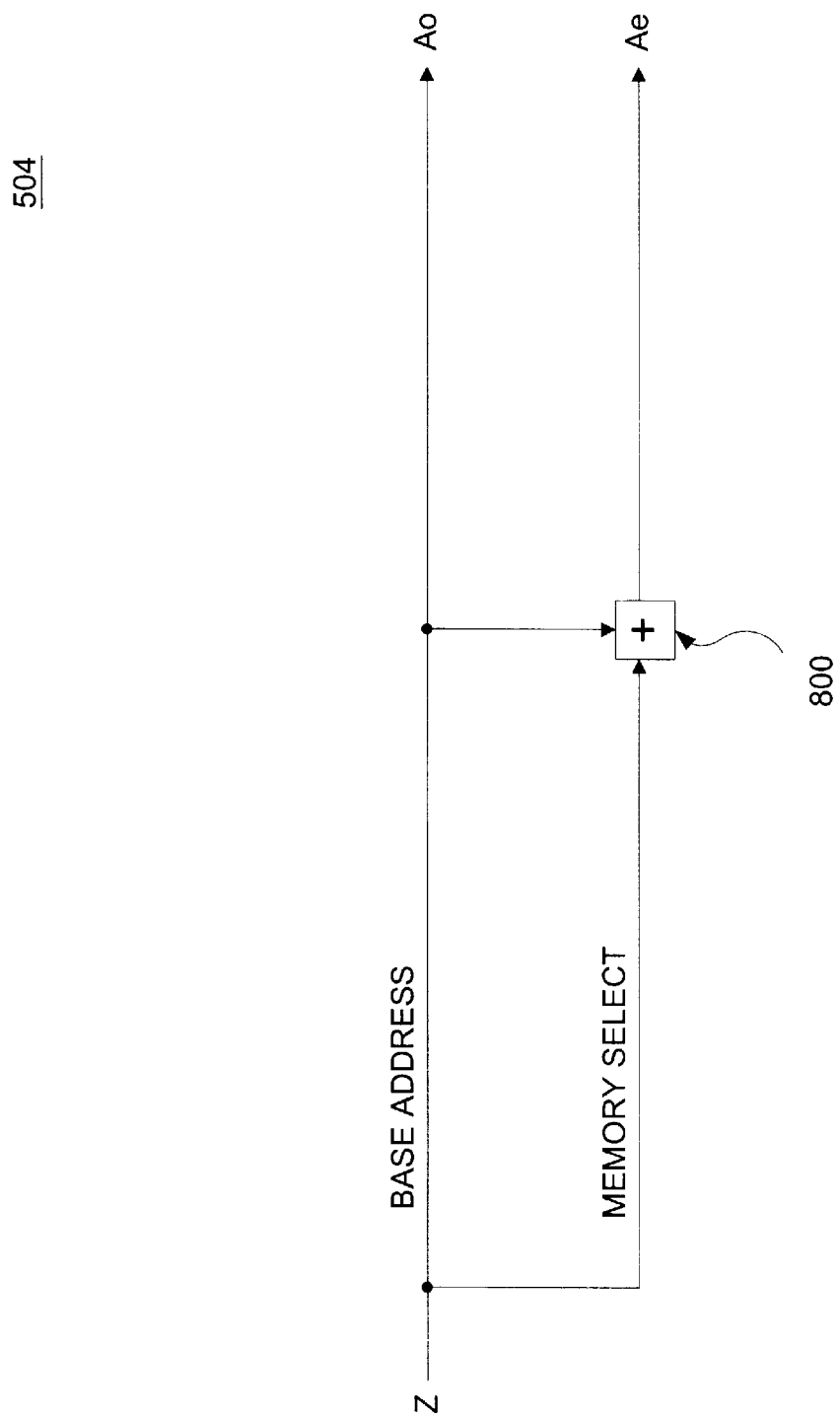
FIG. 8 is a block diagram of an embodiment of the index generator 504 of FIG. 5.

FIG. 8 is a block diagram of an embodiment of the index generator 504 of FIG. 5. The index generator 504 includes an adder 800. The adder 800 receives the 5-bit base address and adds it to the 1-bit memory select to produce the even address Ae. The index generator 504 also passes through the base address unchanged as the odd address Ao.

Figure 9:
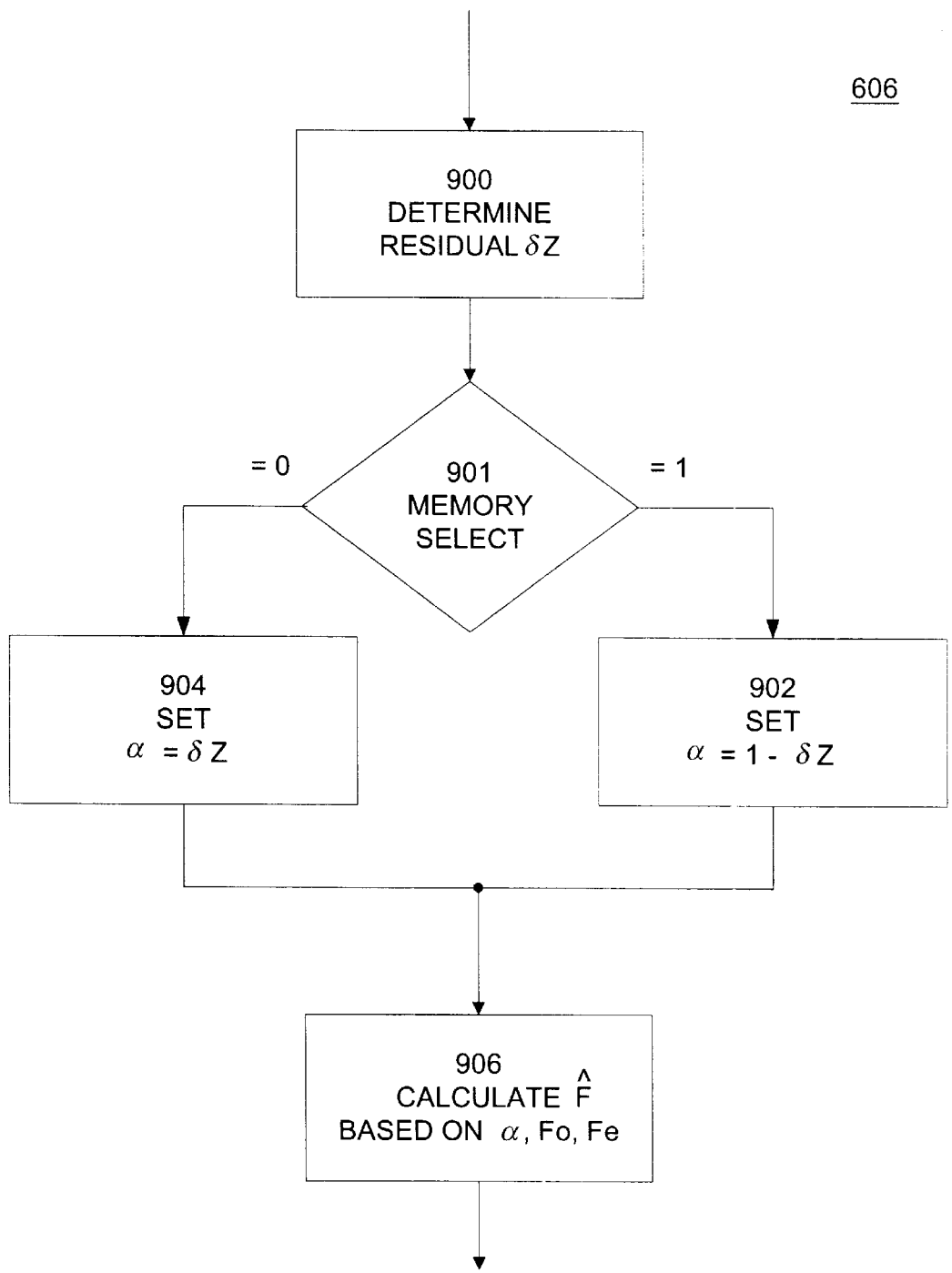
FIG. 9 is a flow diagram illustrating a preferred embodiment of step 606 of FIG. 6 of computing the approximate value of fog function F.

FIG. 9 is a flow diagram illustrating a preferred embodiment of step 606 of FIG. 6 of computing the approximate fog function Fapprox. The arithmetic circuit 502 determines 900 the residual δz. The arithmetic circuit 502 then generates a blend factor α in steps 901, 902 and 904. Approximate fog function Fapprox is calculated 906 based on blend factor α, and sample values Fe and Fo. This flow diagram will be illustrated by continuing the above two examples, which assume that Fapprox is based on a linear interpolation of Fe and Fo. However, other formulation for Fapprox may be used, including the approaches disclosed in U.S. Pat. Nos. 5,345,541 and 5,444,835, as discussed previously. As a further example, calculation of Fapprox could be based on non-linear interpolations, such as a polynomial fit, and/or based on interpolations using more than the two nearest sample points Fe and Fo. As an example, the interpolation could be based on fitting a cubic to the four closest sample points and using four single-port memories to achieve the result. As a final example, the interpolation may use more or less than 64 sample points and they need not be evenly spaced.

Continuing example one, the residual δz=00001111. The interval Δz=100000000 since the sampled values are evenly spaced. Applying standard linear interpolation then yields $$F\text{approx }(z)=[\delta z/\Delta z]F(i+1)+[(\Delta z-\delta z)/\Delta z]F(i)$$

But F(i+1)=Fo, F(i)=Fe, and Δz−δz is just the two's complement of δz, which will be denoted by the underbar δz. The two's complement δz may also be equivalently expressed as (1−δz). Substituting yields $$F\text{approx}(z)=[\delta Fo+\underline{\delta z}Fe]/\Delta z$$

Now let a blend factor α=δz and remove the division by Δz since this may be implemented by shifting the decimal point. This yields $$F\text{approx}(z)=\alpha Fo+(1-\alpha)Fe$$

where the expression (1−α) has been equivalently substituted for the two's complement α.

In example two, the same initial equation applies but F(i+1)=Fe and F(i)=Fo so $$F\text{approx}(z)=[\delta z\ Fe+\underline{\delta z}Fo]/\Delta z$$

Now let α=δz rather than α=δz to yield $$F\text{approx}(z)=\alpha Fo+(1-\alpha)Fe,$$

which is the same final equation as in example one, but with a different definition for α.

Referring again to FIG. 9, the definition of blend factor α depends 901 on memory select 206. If memory select is asserted, then the blend factor α is set 902 equal to (1−δz). In a preferred embodiment, the blend factor is produced by taking the two's compliment of the residual δz. If memory select is not asserted, then the blend factor α is set 904 equal to the residual δz. The arithmetic circuit 502 then calculates 906 the approximate value of the dependent variable F according to Fapprox (z)=αFo+(1−α) Fe in this example embodiment.

Figure 10:
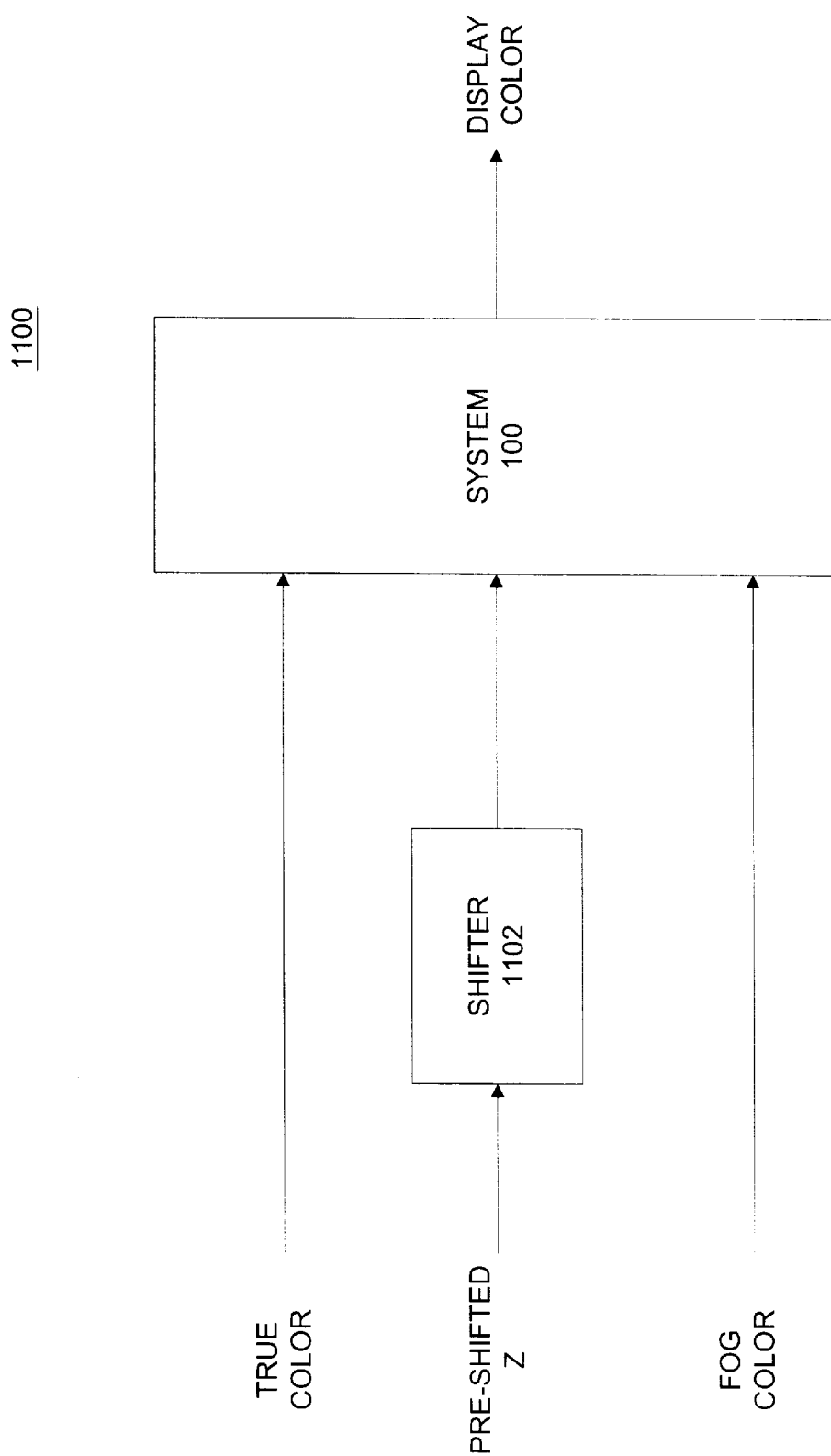
FIG. 10 is a block diagram of another system 1100 in accordance with the invention.

FIG. 10 is a block diagram of another system 1100 in accordance with the invention. System 1100 includes system 100 but further includes a bit shifter 1102. The shifter 1102 is adapted to receive a preshifted version of the distance z. It shifts the received version by a predetermined number of bits to produce the distance z which is sent to system 100. One advantage of this system 1100 is as follows. In the example used throughout this description, the unshifted distance z is sampled evenly over the interval [0, 1]. In many applications, however, most of the values of interest may fall in a compressed range and will not span the entire interval. For example, z may always fall in the interval [7/8, 1]. In other words, the three most significant bits of z will always be 111. By shifting z three bits to the left, the three most significant bits will effectively be dropped and interpolation will be based on the remaining bits. In effect, the interpolation will be based on 64 samples evenly spaced across the interval [7/8, 1] rather than 64 samples evenly spaced across the interval [0, 1], thus increasing the accuracy of the interpolation.

Although the invention has been described in considerable detail with reference to certain preferred embodiments, other variations and embodiments are possible. Many aspects of the disclosed embodiments were chosen for purposes of clarity of explanation. Therefore, the scope of the appended claims should not be limited to the description of the preferred embodiments contained herein.

What is claimed is:

1. A device for generating a display color by blending a true color and a fog color according to a distance z, the device comprising:

an index generator for generating a first memory address and a second memory address from a received distance z;

a first memory coupled to receive the first memory address for reading a first sampled value of a fog function stored at said first memory address;

a second memory coupled to receive the second memory address for reading a second sampled value of the fog function stored at said second memory address;

an arithmetic circuit coupled to receive the first and second sampled values of the fog function for calculating an approximate value of the fog function corresponding to the distance z; and a color blending circuit adapted to receive the true color and the fog color and coupled to receive the approximate value of the fog function for generating the display color.

2. The device of claim 1 wherein:

the first and second sampled values are consecutive sampled values of the fog function; and the arithmetic circuit calculates the approximate value of the fog function according to a linear interpolation of the first and second sampled values of the fog function.

3. The device of claim 2 wherein:

the arithmetic circuit is additionally coupled to receive a residual of the distance z, generates a blend factor based on the residual, and calculates the approximate value of the fog function according to (the blend factor)*(the second sampled value)+(1−the blend factor)*(the first sampled value).

4. The device of claim 1 wherein:

the color blending circuit generates the display color according to a linear combination of the fog color and the true color.

5. The device of claim 1 wherein:

the distance z is represented by a plurality of bits;

a predetermined number N of the most significant of the plurality of bits constitutes an index to sampled values of the fog function, the (N−1) most significant bits of the index constitute a base memory address, and the least significant bit of the index constitutes a memory select; and the remaining of the plurality of bits represents a residual of the distance z.

6. The device of claim 5 wherein:

the sampled values of the fog function are stored alternately in the first and second memories;

the first memory address is based on the base address if the memory select is not asserted, and is based on (the base address+1) if the memory select is asserted; and the second memory address is based on the base address.

7. The device of claim 6 wherein:

the arithmetic circuit is additionally coupled to receive the residual;

the arithmetic circuit generates a blend factor equal to the residual if the memory select is asserted and equal to (1−the residual) if the memory select is not asserted; and the arithmetic circuit calculates the approximate value according to (the blend factor)*(the second sampled value)+(1−the blend factor)*(the first sampled value).

8. The device of claim 5 wherein:

the value of the distance z lies within interval [0,1]; and the sampled values of the fog function correspond to values of the distance z which are evenly distributed over the interval [0,1].

9. The device of claim 5 further comprising:

a shifter adapted to receive a pre-shifted plurality of bits representing a pre-shifted value of the distance z and coupled to the index generator for shifting the pre-shifted plurality of bits by a predetermined number of bits to generate the value received by the index generator;

the pre-shifted value of the distance z lying within an interval [0,1], the value received by the index generator lying within a predetermined subset of the interval [0,1], and the sampled values of the fog function corresponding to values of the distance z which are evenly distributed over the predetermined subset.

10. The device of claim 5 wherein:

the value of the distance z is represented by 14 bits; and the predetermined number N=6.

11. The device of claim 1 wherein:

the first and second memories are adapted to receive a clock; and the first and second sampled values of the fog function are both read within a single clock cycle.

12. A device for calculating an approximate value of a dependent variable corresponding to a value of an independent variable based on sampled values of the dependent variable, the device comprising:

an index generator adapted to receive the value of the independent variable for generating a first memory address and a second memory address;

a first memory coupled to receive the first memory address for reading a first sampled value of the dependent variable;

a second memory coupled to receive the second memory address for reading a second sampled value of the dependent variable; and an arithmetic circuit coupled to receive the first and second sampled values for calculating the approximate value of the dependent variable.

13. The device of claim 12 wherein:

the first and second sampled values are consecutive sampled values of the dependent variable.

14. The device of claim 12 wherein:

the arithmetic circuit calculates the approximate value according to a linear interpolation of the first and second sampled values of the dependent variable.

15. The device of claim 12 wherein:

the value of the independent variable is represented by a plurality of bits;

a predetermined number N of the most significant of the plurality of bits constitutes an index to the sampled values of the dependent variable, the (N−1) most significant bits of the index constitute a base memory address, and the least significant bit of the index constitutes a memory select; and the remaining of the plurality of bits represents a residual of the independent variable.

16. The device of claim 13 wherein:

the sampled values of the dependent variable are stored alternately in the first and second memories;

the first memory address is based on the base address if the memory select is not asserted, and is based on (the base address+1) if the memory select is asserted; and the second memory address is based on the base address.

17. The device of claim 16 wherein:

the arithmetic circuit is additionally coupled to receive the residual;

the arithmetic circuit generates a blend factor equal to the residual if the memory select is asserted and equal to (1−the residual) if the memory select is not asserted; and the arithmetic circuit calculates the approximate value according to (the blend factor)*(the second sampled value)+(1−the blend factor)*(the first sampled value).

18. The device of claim 12 wherein:

the first and second memories are adapted to receive a clock; and the first and second sampled values of the dependent variable are both read within a single clock cycle.

19. A method for generating a display color by blending a true color and a fog color according to a distance z, the method comprising:

receiving the distance z, the true color, and the fog color;

generating a first memory address and a second memory address responsive to the distance z;

reading in parallel a first sampled value of a fog function from the first memory address of a first memory and a second sampled value of the fog function from the second memory address of a second memory;

calculating an approximate value of the fog function corresponding to the distance z based on the first and second sampled values of the fog function; and calculating the display color based on the approximate value of the fog function, the true color, and the fog color.

20. The method of claim 19 wherein:

the approximate value of the fog function is calculated according to a linear interpolation of the first and second sampled values of the fog function.

21. The method of claim 19 wherein:

the display color is calculated according to a linear combination of the true color and the fog color.

22. The method of claim 19 wherein:

the distance z is represented by a plurality of bits;

a predetermined number N of the most significant of the plurality of bits constitutes an index to the sampled values of the fog function, the (N−1) most significant bits of the index constitute a base address, and the least significant bit of the index constitutes a memory select; and the remaining of the plurality of bits represent a residual of the distance z.

23. The method of claim 22 wherein:

the first memory address is based on the base address if the memory select is not asserted, and is based on (the base address+1) if the memory select is asserted; and the second memory address is based on the base address.

24. The method of claim 22 wherein calculating the approximate value of the fog function comprises:

generating a blend factor equal to the residual if the memory select is asserted and equal to (1−the residual) if the memory select is not asserted; and calculating the approximate value of the fog function according to (the blend factor)*(the second sampled value)+(1−the blend factor)*(the first sampled value).

25. The method of claim 24 wherein generating the blend factor comprises setting the blend factor equal to the residual if the memory select is asserted; and generating a two's complement of the residual and setting the blend factor equal to the two's complement if the memory select is not asserted.

26. The method of claim 22 further comprising:

receiving a pre-shifted plurality of bits representing a pre-shifted distance z; and shifting the pre-shifted plurality of bits by a predetermined number of bits to generate the plurality of bits representing the distance z.

27. The method of claim 22 wherein:

the distance z is represented by 14 bits; and the predetermined number N=6.

28. The method of claim 19 wherein:

the first and second sampled values of the fog function are both read in a single clock cycle.

* * * * *